US007982171B2

(12) United States Patent
Katayama

(10) Patent No.: US 7,982,171 B2
(45) Date of Patent: Jul. 19, 2011

(54) DETECTION SENSOR TO DETECT RECEIVING POSITION OF LASER LIGHT AND LEVEL DEVICE EMPLOYING THE DETECTION SENSOR TO DETECT RECEIVING POSITION OF LASER LIGHT

(75) Inventor: Yasutaka Katayama, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 591 days.

(21) Appl. No.: 12/051,451

(22) Filed: Mar. 19, 2008

(65) Prior Publication Data

US 2008/0231838 A1    Sep. 25, 2008

(30) Foreign Application Priority Data

Mar. 20, 2007    (JP) ................. 2007-072099

(51) Int. Cl.
*G01C 3/20* (2006.01)
*G01C 1/00* (2006.01)
*G01J 1/42* (2006.01)

(52) U.S. Cl. ............... 250/206.1; 250/208.2; 356/141.3

(58) Field of Classification Search ............... 250/208.2, 250/206.1, 206.2; 356/139.1, 141.1, 141.2, 356/141.3, 141.5
See application file for complete search history.

(56) References Cited

U.S. PATENT DOCUMENTS

| | | | | |
|---|---|---|---|---|
| 3,649,122 A * | 3/1972 | Holtz | ............................. | 356/4.08 |
| 4,825,291 A * | 4/1989 | Mimura et al. | ............. | 348/220.1 |
| 4,857,721 A * | 8/1989 | Dunavan et al. | ............ | 250/206.1 |
| 4,907,874 A * | 3/1990 | Ake | ............................. | 356/4.08 |
| 4,976,538 A * | 12/1990 | Ake | ............................. | 356/4.08 |
| 5,138,146 A * | 8/1992 | Idesawa | ........................ | 257/72 |
| 5,604,695 A * | 2/1997 | Cantin et al. | ................... | 356/121 |
| 5,796,689 A * | 8/1998 | Houmoto et al. | .......... | 369/44.41 |
| 5,886,776 A * | 3/1999 | Yost et al. | ..................... | 356/4.08 |
| 5,969,338 A * | 10/1999 | Yoshitomi et al. | ............ | 250/221 |
| 6,034,367 A * | 3/2000 | Waczynski et al. | ......... | 250/208.2 |
| 6,873,413 B2 * | 3/2005 | Douglas | ........................ | 356/400 |
| 7,019,278 B2 * | 3/2006 | Douglas | .................... | 250/214 R |
| 7,030,361 B2 * | 4/2006 | Douglas | .................... | 250/214 R |
| 7,119,316 B2 * | 10/2006 | Green et al. | ............... | 250/206.1 |
| 7,227,121 B2 * | 6/2007 | Douglas | .................... | 250/214 R |
| 7,372,011 B2 * | 5/2008 | Green et al. | ............... | 250/214 R |
| 2003/0202172 A1 * | 10/2003 | Douglas | ........................ | 356/121 |
| 2005/0103974 A1 * | 5/2005 | Hsiao | ............................. | 250/206 |
| 2005/0279918 A1 * | 12/2005 | Douglas | .................... | 250/208.2 |
| 2006/0049339 A1 | 3/2006 | Green et al. | | |
| 2007/0084988 A1 * | 4/2007 | Katayama | ................. | 250/214 R |
| 2008/0231838 A1 * | 9/2008 | Katayama | ....................... | 356/72 |

FOREIGN PATENT DOCUMENTS

| | | |
|---|---|---|
| EP | 1 956 340 A1 | 8/2008 |
| JP | 2004-309440 | 11/2004 |
| WO | WO 2007/063893 | 6/2007 |

* cited by examiner

*Primary Examiner* — John R Lee
(74) *Attorney, Agent, or Firm* — Dickstein Shapiro LLP

(57) ABSTRACT

A detection sensor to detect a receiving position of laser light according to the present invention includes a pair of light receiving element arrays (11X and 11Y), wherein adjacent light receiving elements (PDXi) are positioned as spaced equidistantly from one another and are mutually connected via a resistor (RXj), and wherein the output lines (11a and 11b) are respectively connected to the light receiving elements that are present at both ends of the respective light receiving element arrays (11X and 11Y). The light receiving element arrays (11X and 11Y) configure a composite array wherein the light receiving elements of a first light receiving element array are respectively positioned between the mutually adjacent light receiving elements of a second light receiving element array. When the laser beam makes contact with any of the light receiving elements, an analysis arithmetic device derives the position whereupon the laser beam is received, by performing a computation in accordance with the output that is obtained from each respective output line.

6 Claims, 5 Drawing Sheets

DETECTION SENSOR TO DETECT RECEIVING POSITION OF LASER LIGHT AND LEVEL DEVICE EMPLOYING THE DETECTION SENSOR TO DETECT RECEIVING POSITION OF LASER LIGHT

CROSS REFERENCE TO RELATED APPLICATION

The present application is based on and claims priority from Japanese Patent Application No. 2007-72099, filed on Mar. 20, 2007, the disclosure of which is hereby incorporated by reference herein in its entirety.

BACKGROUND OF THE INVENTION

1. Field of the Invention

The present invention relates to an improvement in a detection sensor to detect a receiving position of laser light and a level device that employs the detection sensor to detect the receiving position of laser light.

2. Description of Related Art

A detection sensor to detect a receiving position of laser light that vertically arranges a plurality of light receiving elements into an array is a conventionally known art; refer, for example, to Japanese Patent Publication Laid Open No. 2004-309440. A level device that employs the detection sensor to detect a receiving position of laser light is a similarly known art.

The detection sensor to detect a receiving position of laser light uses a respective amplifier to amplify a light receiving signal that is outputted by each respective beam receiving element, uses a respective comparator to compare the light receiving signal that is outputted by each respective amplifier with a threshold value, and deriving a central position of the laser beam in accordance with a comparison signal that is outputted by each respective comparator.

The conventional detection sensor to detect a receiving position of laser light suffers from being expensive, because it is necessary to connect each respective light receiving element with each respective amplifier and each respective comparator, which drives an increasing complexity in a circuitry configuration and results in a large number of circuit elements.

A detection sensor to detect a receiving position of laser light has thus been proposed that is capable of achieving a simplification of the circuitry configuration and reducing the number of circuit elements, i.e., WO2007/063893. Note that the detection sensor to detect a receiving position of laser light that is disclosed according to WO2007/063893 is not a conventionally known art as of the date of the present application.

The detection sensor to detect a receiving position of laser light is configured such that a plurality of light receiving elements are arranged in an array, an output element that is mutually contiguous with the light receiving element is connected via a resistor, and a light receiving position of the laser beam is derived by performing an arithmetic computation in accordance with each respective output signal that is outputted by an output line that is connected to the light receiving element that is arranged in the array, and that is present within each respective terminal of the light receiving element.

FIG. 1 is a block circuit diagram of the detection sensor to detect a receiving position of laser light that is disclosed according to WO2007/063893, wherein the detection sensor to detect a receiving position of laser light 10 comprises a light receiving element array 11X.

The light receiving element array 11X arranges an array of a light receiving element $PDX_i$, where i is a positive integer from 1 to n+1, of a uniform shape and size, that is configured of such as a plurality of photodiodes, from either top to bottom or from left to right, i.e., in either a vertical or a horizontal direction, at, for example, an evenly spaced interval.

In the present circumstance, the evenly spaced interval means that, given a presumption that the shape of the light receiving element $PDX_i$ is a square, that a distance P between a center of a square thereof and another square thereof is mutually equal, and that an interval GL between the light receiving element $PDX_i$ and an adjacent light receiving element $PDX_{i+1}$ is equivalent to a width W of the light receiving element.

The output terminals, or anodes, of each respective pair of adjacent light receiving elements are mutually connected by a resistor, i.e., a resistance value, $RX_j$, where j is a positive integer from 1 to n. The anode of the first light receiving element $PDX_1$ is connected to a first amplifier circuit 20X via an output line 11a, and is grounded via a resistor RXL. A cathode of each respective light receiving element $PDX_i$ is grounded by a commonly shared line 11c.

An amplification signal that is outputted from the first amplifier circuit 20X is inputted into a first peak hold circuit 12X, an amplification signal that is outputted from a second amplifier circuit 40X is inputted into a second peak hold circuit 13X, the respective peak hold circuits 12X and 13X hold a peak value of each respective amplification signal, and each respective peak value signal is outputted to an analysis arithmetic device 60. The analysis arithmetic device 60 is configured, at a minimum, of a conversion part that converts an analog signal to a digital signal, and an arithmetic part.

A length L of the light receiving element array 11X is related, via the resistor $RX_j$, to a voltage that is generated in a resistor RXH and the resistor RXL that are connected to the output line 11a and an output line 11b, and a laser light receiving position is derived as described hereinafter.

For purposes of convenience of description, it is presumed that a resistance value of the resistor RXL and a resistance value of the resistor RXH are equivalent to one another, and that each respective resistance value $RX_j$ is also equivalent to every other resistance value $RX_j$. It is also presumed that the length of the light receiving array 11X is L, and further presumed that an origin O is a position midway between the first light receiving element $PDX_1$ and the n+1 light receiving element $PDX_{n+1}$.

When a spot S of a laser beam makes contact with the light receiving element $PDX_i$ of the light receiving element array 11X, an output current Ip, which is within the light receiving element $PDX_i$, is discharged therefrom. The current Ip is split by the resistance value of the resistor $RX_j$ and discharged to the resistor RXH and the resistor RXL, whereupon a voltage VXL is generated in the output line 11b by the resistor RXL, and a voltage VXH is generated in the output line 11a by the resistor RXH.

In the present circumstance, $VXH = RXH \times Ip / $(a sum of a resistance value ranging from a resistor $RX_1$ to a resistor $RX_{j-1}$)

Accordingly, it is possible to employ the analysis arithmetic device 60 to derive a distance Lp to the light receiving position P, using the following equation:

$Lp = (L/2) \times (VXH - VXL)/(VXH + VXL)$

Note that a level device that comprises a detection sensor to detect a receiving position of laser light of such a type as the foregoing may be employed, for example, in receiving a laser beam that is emitted by a rotary laser and measuring such as a height above a horizontal level reference plane.

As per established art, the rotary laser would, for example, emit a laser beam in a rotary manner in a horizontal direction at a given angular momentum in the direction of the rotation of the rotary axis, and the level device would, for example, be positioned in a plurality of locations in a range between, for example, five meters, i.e., close range, and 500 meters, i.e., long range, from the rotary laser, in a horizontal direction, and receive the laser beam thereupon.

Whereas a diameter of the laser beam, i.e., a spot diameter, is narrow at close range, the spot diameter increases at long range, and a time that the spot requires to traverse the light receiving element $PDX_i$ decreases at long range. Accordingly, while it is conceivable that a light receiving area of the light receiving element $PDX_i$ might be made larger in order to allow measurement thereof at long as well as short range, in general, the larger the light receiving area of the light receiving element $PDX_i$, the lower the frequency that is responsive to the laser light, and moreover, the amplitude-frequency response with regard to the laser light also decreases as the number of the light receiving element $PDX_i$ increases. A similar effect is observed when the number of the resistor $RX_j$ increases as well.

Consequently, there is an upper bound to the number of the light receiving element $PDX_i$ and the number of the resistor $RX_j$ that are employed in a single light receiving array 11X, owing to the relation between the amplitude-frequency response with regard to the laser beam, the quantity of light in the laser beam, and the light receiving element $PDX_i$ that is employed in measuring the quantity of light in the laser beam.

Furthermore, while increasing the resistance value of the resistor $RX_j$ improves the precision of the position detector, the laser light receiving output saturates the output of the light receiving element $PDX_i$ in small stages, and thus, there is an upper bound to increasing the resistance value of the resistor $RX_j$ from the standpoint of the maximum power that is required of the laser beam.

Thus, the size and the quantity of the light receiving element $PDX_i$, and the quantity and the resistance value of the resistor $RX_j$, are determined in accordance with the precision and the environment that are required as the laser light receiving position, and it is consequently necessary to arrange the light receiving element array 11X in a plurality of series when the length L of a single light receiving element array 11X is insufficient for the required detection length.

In addition, while the detection sensor to detect a receiving position of laser light is configured such that a center position of the spot S of the laser beam is detected, there is no guarantee that the laser beam includes a given light amount distribution characteristic, or beam profile, i.e., a beam profile of the laser beam may not necessarily be a normal distribution, with a uniform brightness or flatness, and the detection precision degrades when the spot S of the laser beam is removed from the detection area of the light receiving element $PDX_i$, i.e., the interval from the light receiving element $PDX_1$ that is present at a first terminal of the light receiving element array 11X to the light receiving element $PDX_{n+1}$ that is present at a second terminal thereof.

Accordingly, a configuration such as is depicted in FIG. 2 is conceivable, wherein the light receiving element array 11X and a light receiving element array 11Y are vertically arranged in a series, the origin O is treated as the position midway between the light receiving element PDXn+1 that is present at the other terminal of the upper light receiving element array 11X and the light receiving element PDX1 that is present at a first terminal of the lower light receiving element array 11Y, and the reception position of the laser beam is detected by way of a weighted average of the light receiving element arrays 11X and 11Y.

For purposes of convenience of description, in FIG. 2, a laser beam spot Smn is depicted that includes a diameter of a length that is equal to a pitch P, and a laser beam spot Smn' is depicted that includes a diameter of a length that is equal to a 1.5 times the pitch P. The right hand side of the drawing depicts a relation between a quantity of movement of the laser beam and the output voltage, with the quantity of movement of the laser beam assigned to a horizontal axis, and the output voltage assigned to a vertical axis. It is to be understood that, in the present circumstance, output voltage corresponds to a relative ratio of the VXH and the VXL. For example, if it is presumed that a focus is on the light receiving element $PDX_{n+1}$ at the other terminal of the light receiving element array 11X and the laser beam makes contact with the light receiving element $PDX_{n+1}$, then the output current Ip that is outputted from the light receiving element PDXn+1 is a constant, even if the laser beam spot Smn moves by a distance Lv, and there is, accordingly, no change in the output voltage. The same is also true of the light receiving element $PDX_1$ at a first terminal of the light receiving element array 11Y, and is also true for the balance of the light receiving elements $PDX_i$ of each respective light receiving element array 11X and 11Y.

In addition, when the laser beam spot Smn is present in the position midway between the adjacent light receiving elements $PDX_i$, such as is depicted by a dashed line originating at the laser beam spot Smn, an output is generated that corresponds to the position midway therebetween, and the output is converted proportionally as the laser beam spot Smn moves contiguously, and a broken line-like stepped straight line BDL is obtained in an interval between the quantity of movement of the laser beam in the vertical direction and the output voltage thereof.

In addition, when the laser beam spot Smn is present between the light receiving element $PDX_{n+1}$ at the other terminal of the light receiving element array 11X and the light receiving element $PDX_1$ at a first terminal of the light receiving element array 11Y, the output of the light receiving element changes in a noncontiguous manner, and thus, the origin O may be obtained by taking a weighted average of the output of the light receiving element $PDX_1$ of the light receiving element array 11Y and of the output of the light receiving element $PDX_{n+1}$ of the light receiving element array 11X. When the diameter of the laser beam spot S is smaller than the pitch P of the light receiving element, as in the present circumstance, it is possible to derive the position of the origin O by way of the weighted average with a high degree of precision.

In the case of the laser beam spot Smn', with the diameter of 1.5 times the pitch P, for example, when focusing on the light receiving element array 11Y, for example, as depicted in FIG. 2, the laser beam spot Smn' changes in a straight line upon making contact with any of the light receiving elements that are associated with the light receiving element array 11Y, with an exception of the light receiving elements in a vicinity of the origin O, and, accordingly, a straight line SDL is obtained. As the laser beam spot Smn' moves from a light receiving element $PDX_2$ of the light receiving element array 11Y toward the origin O, however, the laser beam spot Smn' gradually loses contact with the light receiving element $PDX_2$ of the light receiving element array 11Y, a change occurs in an output voltage that is outputted from an output line 11a and 11b of the light receiving element array 11Y. As a consequence thereof, when the diameter of the laser beam spot Smn' becomes greater than the pitch P, it becomes impossible to derive the position of the origin O with a high degree of precision, even when employing the weighted average.

While it would also be conceivable to overlap the light receiving element $PDX_{n+1}$ that is present at the other terminal of the upper light receiving element array 11X and the light receiving element $PDX_1$ that is present at a first terminal of the lower light receiving element array 11Y in a height direction thereof, the spot diameter of the laser beam increases, it becomes necessary to increase a quantity of the overlap thereof, and thus, the detection sensor to detect a receiving position of laser light cannot be utilized in an effective manner.

SUMMARY OF THE INVENTION

An object of the present invention is to provide a detection sensor to detect a receiving position of laser light and a level device that employs the detection sensor to detect a receiving position of laser light that is capable of extending a light receiving element array overall, while achieving an improvement in a precision of detection of a laser light receiving position.

In order to achieve the object, a detection sensor to detect a receiving position of laser light according to an embodiment of the present invention includes, at a minimum, two light receiving element arrays, wherein a light receiving element is placed equidistant to an adjacent light receiving element, the adjacent light receiving elements are mutually connected via a resistor, the light receiving elements that are present at the respective ends of the light receiving element arrays are respectively connected to an output line, and the at a minimum two light receiving element arrays configure a composite array wherein the light receiving element of a first light receiving element array is positioned in an interval between the adjacent light receiving elements of a second light receiving element array, each respective output line is connected to an analysis arithmetic device, wherein the analysis arithmetic device is capable of computationally deriving a light receiving position of a laser beam when the laser beam makes contact with any of the adjacent light receiving elements, in accordance with an output that is obtained from each respective output line.

DETAILED DESCRIPTION OF THE PREFERRED EMBODIMENTS

Preferred embodiments of the present invention will be described in detail hereinafter, with reference to the accompanying drawings.

First Embodiment

Figure 3:
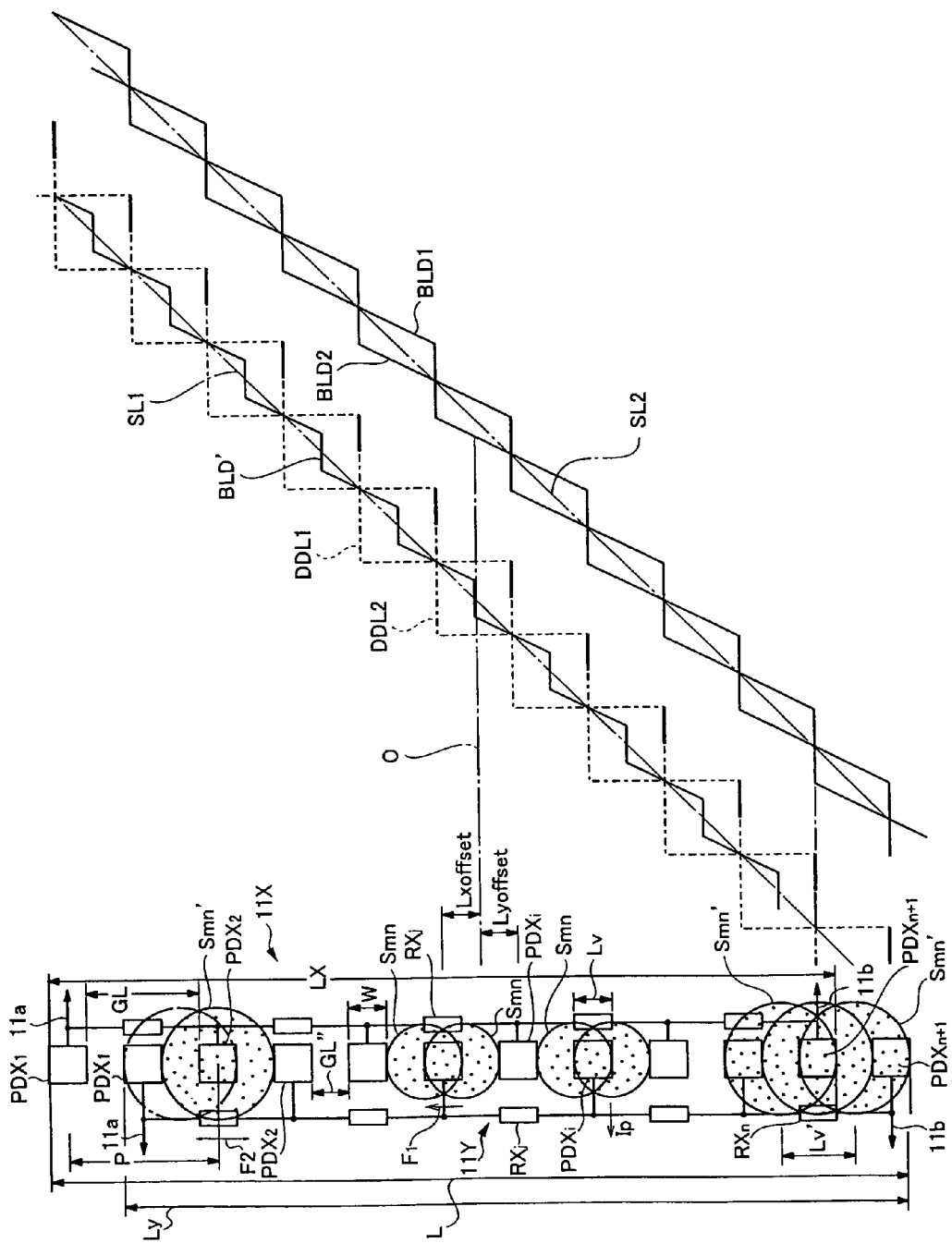
FIG. 3 is a circuit block diagram that describes a configuration of an essential component according to a first embodiment of a detection sensor to detect a receiving position of laser light according to the present invention.

FIG. 3 is a circuit block diagram that describes a configuration of an essential component according to a first embodiment of a detection sensor to detect a receiving position of laser light according to the present invention.

The detection sensor to detect a receiving position of laser light that is depicted in FIG. 3 comprises a plurality of, preferably, two light receiving element arrays 11X and 11Y, which share a common configuration. Each respective light receiving element array 11X and 11Y includes at least one, preferably, a plurality of light receiving elements $PDX_i$, where i is a positive integer from 1 to n+1. In the present circumstance, the number of light receiving elements of each respective light receiving element array 11X and 11Y is six. The light receiving element $PDX_i$ includes a common shape and size, and in the present circumstance, the light receiving element $PDX_i$ is rectangular, for example, a square. Each respective light receiving element $PDX_i$, where i is a positive integer from 1 to n+1, of each respective light receiving element array 11X and 11Y is arranged in an array in either a vertical direction or a horizontal direction with, for example, an equidistant spacing.

Put another way, the pitch P of the adjacent light receiving element that is associated with a given light receiving element array is itself uniform, and the pitch P is treated in the present circumstance as being four times a width W of the light receiving element $PDX_i$, and an interval GL between the light receiving element $PDX_i$ and an adjacent light receiving element $PDX_{i+1}$ is treated as being three times the width W of the light receiving element $PDX_i$.

Whereas in the present circumstance, it is presumed that the shape of the light receiving element $PDX_i$ is rectangular, and the pitch P is defined as a distance from a center of the rectangle thereof to a center of another rectangle thereof, it would be permissible for the shape of the light receiving element $PDX_i$ to be circular as well.

An output terminal, or an anode, of the light receiving element $PDX_i$ is connected to the anode of the adjacent light receiving element $PDX_i$ by a resistor, i.e., a resistance value, $RX_j$, where j is a positive integer from 1 to n. In the present circumstance, the number of resistors $RX_j$ is five.

Figure 1:
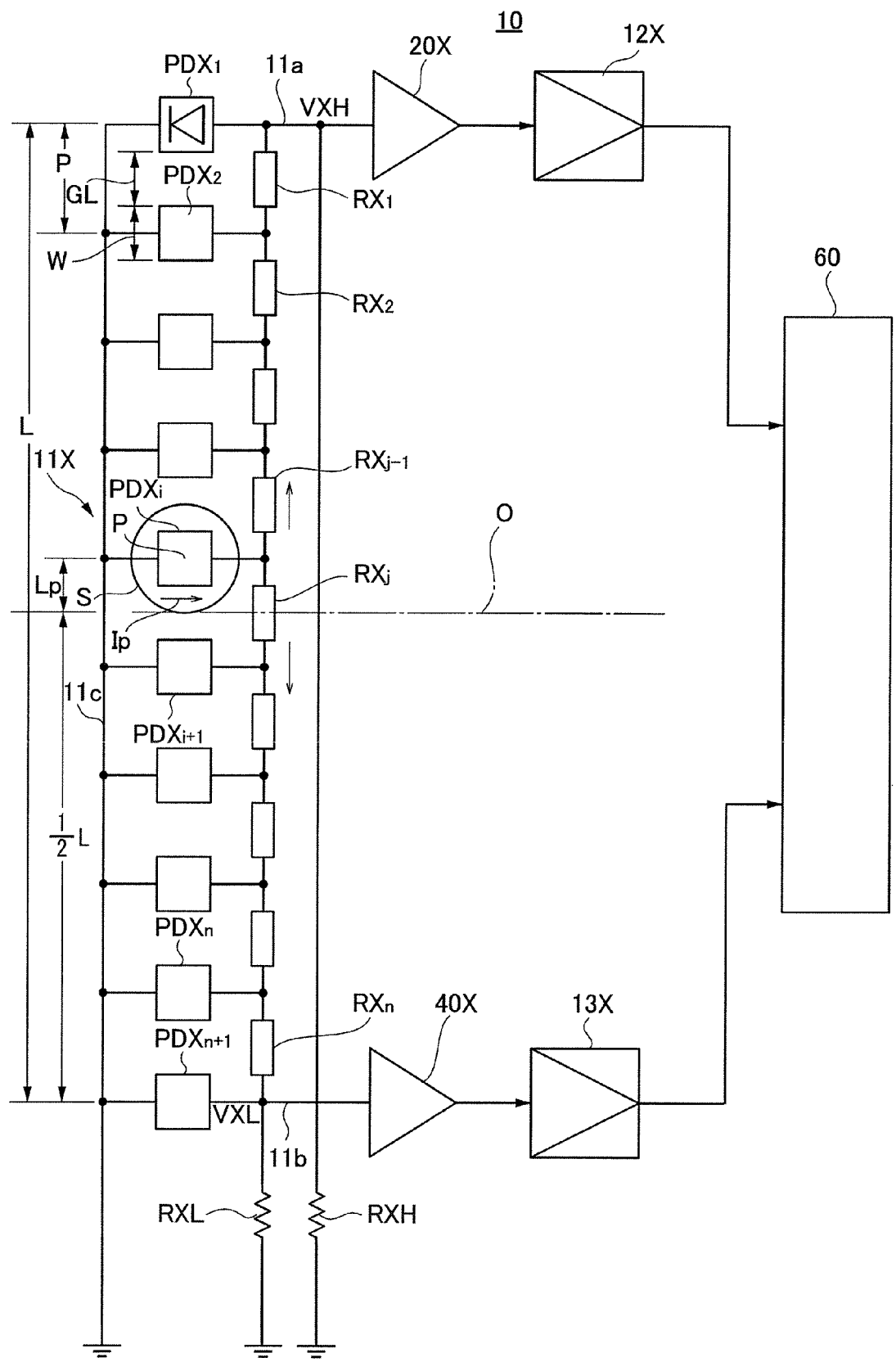
FIG. 1 is a circuit block diagram that describes a configuration of an essential component of a detection sensor to detect a receiving position of laser light according to the present invention, according to a related art.

The anode of the light receiving element $PDX_1$, which is present at a first end of each respective light receiving element array 11X and 11Y, is connected to a first amplification circuit 20X, as depicted in FIG. 1, via an output line 11a, and is also grounded via a resistor RXH, also as depicted in FIG. 1. The anode of the n+1 light receiving element $PDX_{n+1}$, which is present at a second terminal of each respective light receiving element array 11X and 11Y, is connected to a second amplification circuit 40X, as depicted in FIG. 1, via an output line 11b, and is also grounded via a resistor RXL, also as depicted in FIG. 1. A cathode of each respective light receiving element $PDX_i$ is grounded by a commonly shared line 11c, as depicted in FIG. 1.

An amplification signal that is outputted from the first amplification circuit 20X is inputted into a first peak hold circuit 12X, as depicted in FIG. 1, an amplification signal that is outputted from the second amplification circuit 40X is inputted into a second peak hold circuit 13X, as depicted in FIG. 1, and the peak hold circuit 12X and 13X respectively hold a peak value of each respective amplification signal, with each respective amplification signal being inputted into an analysis arithmetic device 60, as depicted in FIG. 1.

Put another way, a circuit configuration element that is connected to each respective light receiving element array 11X and 11Y is identical to the circuit configuration element that is depicted in FIG. 1.

The two light receiving element arrays 11X and 11Y configure a composite array wherein the light receiving element $PDX_i$ of the light receiving element array 11Y is positioned in an interval between the adjacent light receiving elements $PDX_i$ of the other light receiving element array 11X.

In the present circumstance, it is presumed that an interval GL between the light receiving element $PDX_i$ of the light receiving element array 11X and the light receiving element $PDX_i$ of the other light receiving element array 11Y is equivalent to the width W of each respective light receiving element $PDX_i$.

For purposes of convenience of description, it is presumed that a resistance value of each respective resistor RXL and a resistance value of each respective resistor RXH are equivalent to one another, and that each respective resistance value $RX_j$ is also equivalent to every other resistance value $RX_j$. It is also presumed that an origin O is a position midway between the fourth light receiving element $PDX_1$ of the light receiving element array 11X that configures the composite array and the third light receiving element $PDX_{n+1}$ of the light receiving element array 11Y that configures the composite array.

When a spot S of a laser beam makes contact with the light receiving element $PDX_i$ of the light receiving element array 11X and 11Y, an output current Ip, which is within the light receiving element $PDX_i$, is discharged therefrom. The current Ip is split by the resistance value of the resistor $RX_i$ and discharged to the resistor RXH and the resistor RXL, whereupon a voltage VXL is generated in the output line 11b by the resistor RXL, and a voltage VXH is generated in the output line 11a by the resistor RXH. The foregoing is as per the description that is given with reference to FIG. 1.

Figure 2:
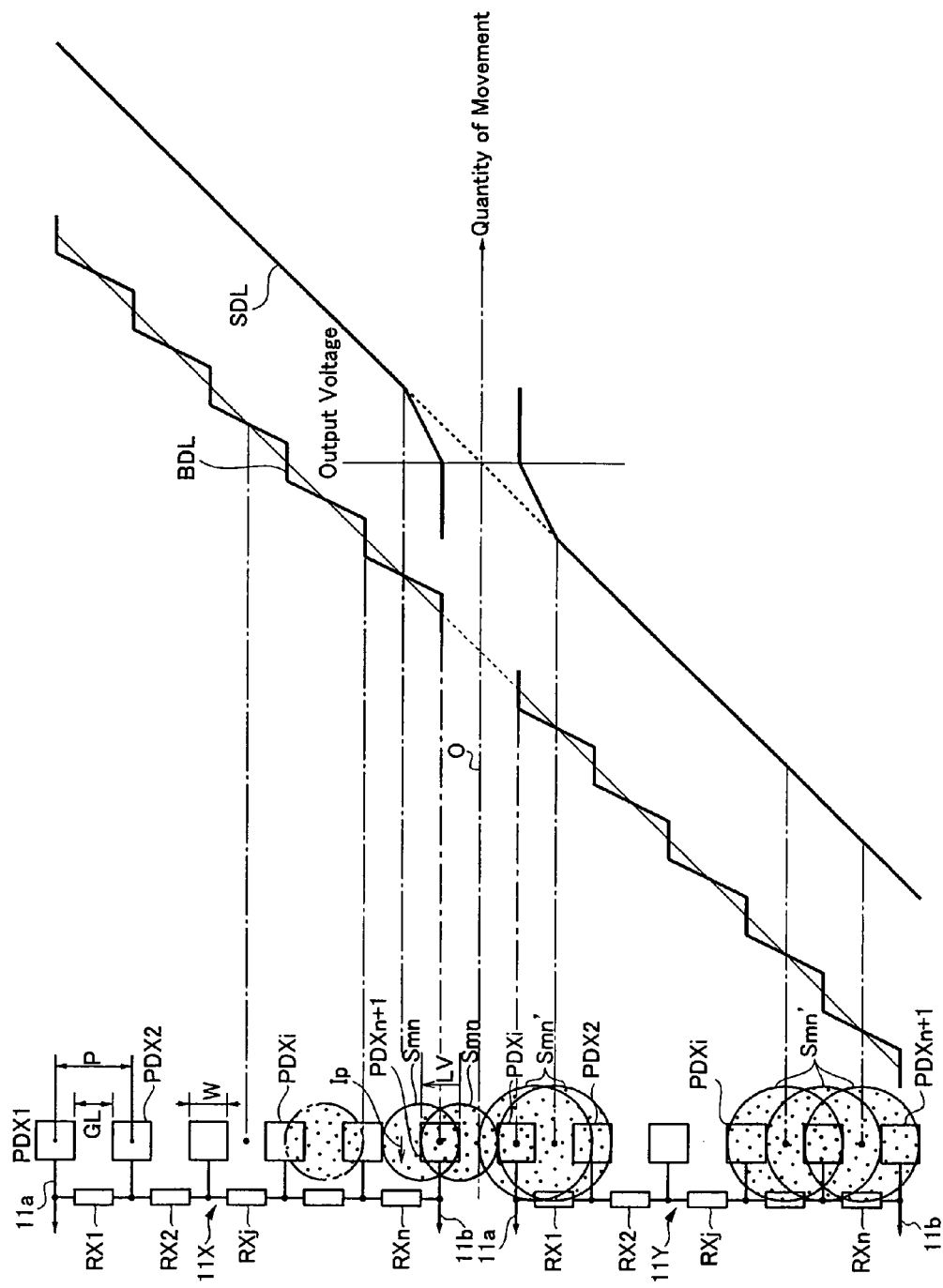
FIG. 2 is a circuit block diagram that describes an improved configuration of the detection sensor to detect a receiving position of laser light that is depicted in FIG. 1.

The pitch P of each respective light receiving element array 11X and 11Y of the detection sensor to detect a receiving position of laser light as depicted in FIG. 1 is twice as large as the pitch P of the light receiving element array that is depicted in FIG. 2, and thus, even if the laser beam spot diameter that is depicted in FIG. 2 is identical to the laser beam spot diameter that is depicted in FIG. 3, a relative size thereof will differ, and a relation between an output of each respective light receiving element array and a quantity of movement of the laser beam will differ.

For example, if a laser beam spot Smn, i.e, a laser beam spot that includes a diameter of a length that is equivalent to the pitch P of the light receiving element $PDX_i$ that is depicted in FIG. 2, which includes a diameter of one half the pitch P of the light receiving element $PDX_i$ that is associated with each respective light receiving element array 11Y, makes contact with the light receiving element $PDX_i$, the output current Ip that is outputted from the light receiving element $PDX_i$ is a constant, even if the laser beam spot Smn moves by a distance Lv, and there is, accordingly, no change in an output voltage.

The same is also true of the light receiving element $PDX_i$ of the light receiving element array 11X, and is also true for the balance of the light receiving elements $PDX_i$ of each respective light receiving element array. In addition, when the laser beam spot Smn moves in a manner such as is depicted by an arrow F1 in FIG. 3, between the adjacent light receiving elements that are associated with the light receiving element array 11X, such as is depicted by a dashed line originating with the laser beam spot Smn, no output voltage is generated. Accordingly, the output undergoes a discrete change in accordance with a contiguous movement of the laser beam spot Smn, and a discrete stepped straight line DDL1 and DDL2 are obtained between the quantity of vertical movement of the laser beam and the output voltage.

Conversely, if a laser beam spot Smn', i.e, a laser beam spot Smn' that includes a diameter of a length that is equivalent to 1.5 times the pitch P of the light receiving element $PDX_i$ that is depicted in FIG. 2, which includes a diameter of four thirds the pitch P of the light receiving element PDXi that is associated with each respective light receiving element array 11X, makes contact with the light receiving element $PDX_{n+1}$, the output current Ip that is outputted from the light receiving element $PDX_{n+1}$ is a constant, even if the laser beam spot Smn' moves by a distance Lv', and there is, accordingly, no change in an output voltage. The same is also true of the light receiving element $PDX_{n+1}$ of the light receiving element array 11Y, and is also true for the balance of the light receiving elements $PDX_i$ of each respective light receiving element array 11X and 11Y.

In addition, for example, if the laser beam spot Smn' is present in a position midway between a light receiving element $PDX_1$ and an adjacent light receiving element $PDX_2$ of the light receiving element array 11Y, when the laser beam spot Smn' deviates in either of a movement direction F2, such as is depicted by a dashed line, an output is generated in response to the deviation thereof, the output undergoes a proportional conversion in accordance with a contiguous movement of the laser beam spot Smn', and a broken line-like stepped straight line BDL1 and BDL2 are obtained between the quantity of vertical movement of the laser beam and the output voltage.

It is possible to obtain a broken line-like stepped straight line BDL' from the discrete stepped straight line DDL1 and DDL2, it is possible to obtain an interpolation straight line SL1 from the broken line-like stepped straight line BDL', and it is possible to obtain an interpolation straight line SL2 from the broken line-like stepped straight line BDL1 and BDL2.

Put another way, treating an estimated center position of a laser beam spot that is estimated by way of a computation that is based on the output of the light receiving element array 11X as Lxp, and treating an estimated center position of a laser beam spot that is estimated by way of a computation that is based on the output of the light receiving element array 11Y as Lyp, allows deriving Lxp and Lyp by way of the following equations:

$$Lxp=(Lx/2)\times(VXH-VXL)/(VXH+VXL)\times\alpha x+Lx \text{ offset}$$

$$Lyp=(Ly/2)\times(VYH-VYL)/(VYH+VYL)\times\alpha y+Ly \text{ offset}$$

Where α is a correction value that is employed in computing the center position of the laser beam spot; and the Lx offset and Ly offset are offset quantities of the light receiving units 11X and 11Y from the origin O, i.e., a geometric center position, wherein setting the offset quantities thereof to either a positive or a negative value changes the position of the origin as appropriate.

An actual center position of the laser beam spot Lp, i.e., a light receiving position, is derived by the following equation:

$$Lp=(Vx\times Lxp+vy\times Lyp)/(Vx+vy)$$

Where Vx=VXH+VXL, and Vy=VYH+VYL

Put another way, the actual center position of the laser beam spot Lp is derived by performing a weighting, and taking a weighted average, of the estimated center position that is derived from the light receiving element array 11X Lxp and of the estimated center position that is derived from the light receiving element array 11Y Lyp.

Whereas, in the present circumstance, the actual center position Lp is derived by taking the weighted average of the light quantity of the laser beam, it would be possible to derive the actual center position of the laser beam spot Lp by taking an average value of the estimated center position that is estimated from both light receiving element arrays, i.e., by way of the following equation, presuming that a laser light amount distribution characteristic, or a beam profile, is uniform, and the laser beam unfailingly makes contact with both the light receiving element array 11X and 11Y:

$$Lp=(Lxp+Lyp)$$

According to the first embodiment, two light receiving element arrays are provided, wherein a light receiving element is placed equidistant to an adjacent light receiving element, the adjacent light receiving elements are mutually connected via a resistor, the light receiving elements that are present at the respective ends of the light receiving element arrays are respectively connected to an output line, the two light receiving element arrays configure a composite array wherein the light receiving element of a first light receiving element array is respectively positioned in an interval between the adjacent light receiving elements of a second light receiving element array, each respective output line is connected to an analysis arithmetic device, wherein the analysis arithmetic device is capable of computationally deriving a light receiving position of a laser beam when the laser beam makes contact with any of the light receiving elements, in accordance with an output that is obtained from the output line of at least one light receiving element which is in contact with the laser beam, and thus, it is possible to lengthen the light receiving element array overall, while achieving an improvement in a precision of detection of the laser light receiving position.

Second Embodiment

Figure 4:
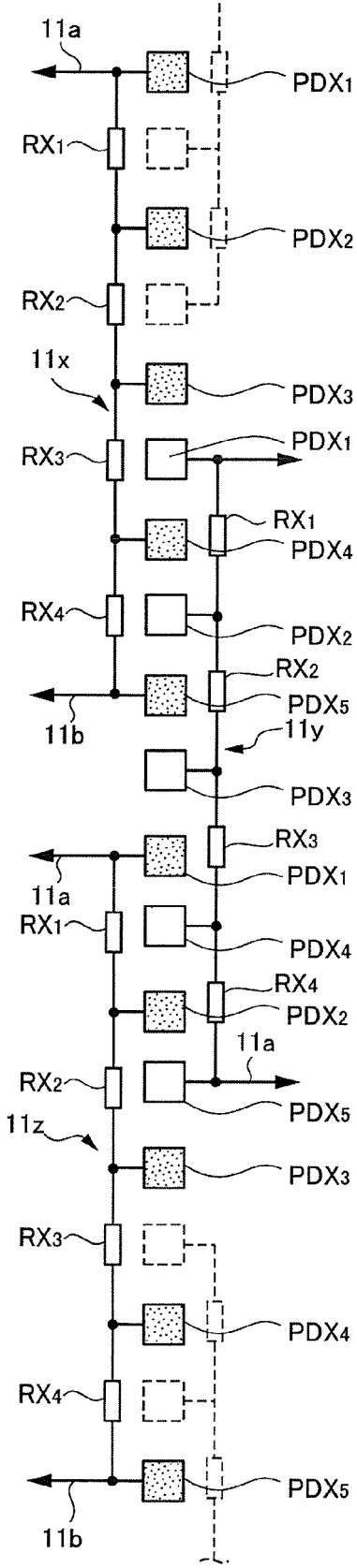
FIG. 4 is a circuit block diagram that describes a configuration of an essential component according to a second embodiment of a detection sensor to detect a receiving position of laser light according to the present invention.

FIG. 4 is a positioning diagram of a light receiving element array that describes a detection sensor to detect a receiving position of laser light according to a second embodiment of the present invention, wherein a composite array is configured from three light receiving element arrays, in the present circumstance.

The composite array includes a light receiving element array 11X and 11Z that are arranged symmetrically on either side of a light receiving element array 11Y, which is located in a center of the composite array. Each respective light receiving element array includes a common assembly, including five light receiving elements and four resistors, respectively. Each respective light receiving element is assigned a reference numeral ranging from $PDX_1$ to $PDX_5$, and each respective resistor is assigned a reference numeral ranging from $RX_1$ to $RX_4$.

A center light receiving element $PDX_3$ of the center light receiving element array 11Y is positioned between a light receiving element $PDX_5$ at a first end of the light receiving element array 11X at a first side of the center light receiving element array 11Y and a light receiving element $PDX_1$ at a second end of the light receiving element array 11Z at a second side of the center light receiving element array 11Y.

A light receiving element $PDX_2$ of the light receiving element array 11Y that is located at the center of the composite array is positioned between a light receiving element $PDX_5$ and a light receiving element $PDX_4$ of the light receiving element array 11X, and a light receiving element $PDX_1$ of the light receiving element array 11Y that is located at the center of the composite array is positioned between the light receiving element $PDX_4$ and a light receiving element $PDX_3$ of the light receiving element array 11X. A light receiving element $PDX_4$ of the light receiving element array 11Y that is located at the center of the composite array is positioned between a light receiving element $PDX_1$ and a light receiving element $PDX_2$ of the light receiving element array 11Z, and a light receiving element $PDX_5$ of the light receiving element array 11Y that is located at the center of the composite array is positioned between the light receiving element $PDX_2$ and a light receiving element $PDX_3$ of the light receiving element array 11Z.

Whereas, in the present circumstance, no light receiving element $PDX_i$ of the light receiving element array 11Y that is located at the center of the composite array is positioned between the light receiving element $PDX_3$ and a light receiving element $PDX_2$ of the light receiving element array 11X, between the light receiving element $PDX_2$ and a light receiving element $PDX_1$ of the light receiving element array 11X, between the light receiving element $PDX_3$ and a light receiving element $PDX_4$ of the light receiving element array 11Z, or between the light receiving element $PDX_4$ and a light receiving element $PDX_5$ of the light receiving element array 11Z, it would be possible to position a light receiving element of another light receiving element array, such as is depicted by a dashed line in FIG. 4, and thereby extend a length of the detection sensor to detect a receiving position of laser light as required.

Put another way, with a focus on, at a minimum, three light receiving element arrays, it is possible to extend the length of the detection sensor to detect a receiving position of laser light by symmetrically positioning the light receiving element array with regard to the center light receiving element array.

Following is a description of deriving an actual center position of the laser beam Lp, presuming that the composite array includes three light receiving element arrays in the present circumstance. A graph depicting a relation between a quantity of movement of the laser beam and the output is omitted herein. The reason thereof is that the present circumstance is principally no different from the circumstance that is described using FIG. 3.

Treating an estimated center position of the laser beam of the light receiving element array 11X, 11Y, and 11Z as Lxp, Lyp, and Lzp, respectively, gives the following equations:

$$Lxp=(Lx/2)\times(VXH-VXL)/(VXH+VXL)\times\alpha x+Lx \text{ offset}$$

$$Lyp=(Ly/2)\times(VYH-VYL)/(VYH+VYL)\times\alpha y+Ly \text{ offset}$$

$$Lzp=(Lz/2)\times(VZH-VZL)/(VZH+VZL)\times\alpha z+Lz \text{ offset}$$

A light receiving position of the laser beam Lp is derived by the following equation:

$$Lp=(Vx\times Lxp+Vy\times Lyp+Vz\times Lzp)/(Vx+Vy+Vz)$$

Where:
Vx=VXH+VXL,
Vy=VYH+VYL, and
Vz=VZH+VZL.

In the present circumstance, if it is presumed that, for example, the laser beam does not make contact with any of the light receiving elements that are associated with the light receiving element array 11Z, then Lzp has no meaning as a practical value, and thus, Lzp becomes unnecessary to the computation.

Put another way, VZH=VZL=0, and Vz=0, and thus, the following equation is employed to derive the light receiving position of the laser beam Lp:

$$Lp=(Vx \times Lxp \times Vy \times Lyp)/(Vx+vy)$$

Put still another way, the present circumstance is identical to the circumstance wherein the number of light receiving element arrays is two.

In general, with a number n of light receiving element arrays, it is possible to represent the light receiving element array as 11Qk, where k is a positive integer from 1 to n, and to derive an estimated center position LQkp that is estimated from the light receiving element array 11Qk via the following equation:

$$LQkp=(LQk/2) \times (VQkH-VQkL)/(VQkH+VQkL1) \times \alpha Qk + LQk \text{ offset}$$

$$VQk=VQkH+VQkL$$

$$Lp=(VQ1 \times LQ1p + VQ2 \times LQ2p + \ldots VQk \times LQkp + \ldots + VQn \times LQnp)/(VQ1+VQ2+\ldots+VQk+\ldots+VQn)$$

In the present circumstance, LQk is a length of a sensor k of the light receiving element array 11Qk, VQkH and VQkL is an output voltage that is outputted from the output line 11a and 11b that is connected to the light receiving element array 11Qk, and αQk is a correction value that is employed in order to compute a center position of the laser beam spot by the light receiving element array 11Qk. LQk offset is a quantity of offset from a kth origin O of the light receiving element array 11Qk, i.e., a geometric center position.

Figure 5:
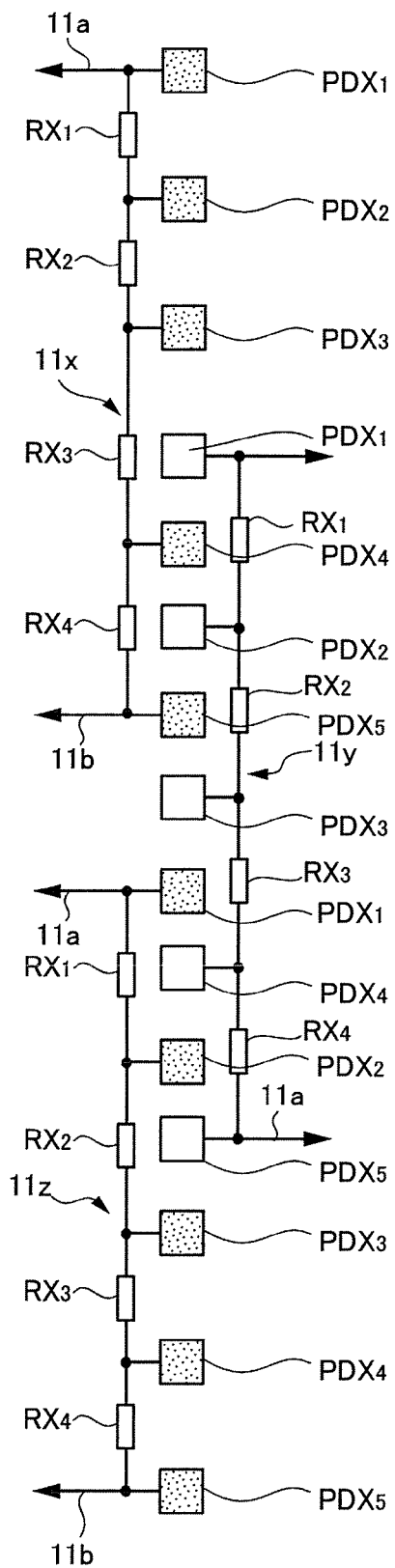
FIG. 5 is a circuit block diagram that describes a configuration of an essential component according to a variant example of the second embodiment of the detection sensor to detect a receiving position of laser light according to the present invention.

Whereas, according to the embodiment, it is presumed that an interval between the light receiving element $PDX_3$ and the adjacent light receiving element $PDX_2$ that are associated with the light receiving element array 11X, an interval between the light receiving element $PDX_2$ and the adjacent light receiving element $PDX_1$ that are associated with the light receiving element array 11X, and an interval between the light receiving element $PDX_4$ that is associated with the light receiving element array 11X and the light receiving element $PDX_5$ that is associated with the light receiving element array 11X are all identical, as depicted in FIG. 5, however, it would also be possible to presume a configuration wherein the interval between the $PDX_3$ and the $PDX_2$ and the interval between the $PDX_2$ and the $PDX_1$ is smaller than the remaining intervals between the light receiving elements, and detecting that the smaller intervals thereof are the terminals. The same is also true of the interval between the light receiving element $PDX_3$ and the adjacent light receiving element $PDX_4$ that are associated with the light receiving element array 11Z, as well as of the interval between the light receiving element $PDX_4$ and the adjacent light receiving element $PDX_5$ that are associated with the light receiving element array 11Z.

In addition, the description according to the second embodiment presumes that the number of light receiving elements of the light receiving element array 11Y is the same as the number of light receiving elements of the light receiving element array 11X and 11Y, it would also be permissible for the number of light receiving elements of the light receiving element array 11X and 11Z to be more or less than the number of light receiving elements of the light receiving element array 11Y.

In essence, all that is necessary is that the light receiving elements that are associated with the light receiving element array 11X and 11Y that are on either side of the light receiving element array 11Y be positioned symmetrically between the light receiving elements that are associated with the light receiving element array 11Y, which is located in the center of the composite array.

According to the second embodiment, it would be possible to extend the sensor length of the detection sensor to detect a receiving position of laser light overall, as required.

As per the foregoing, the detection sensor to detect a receiving position of laser light according to the present invention has the effect of being able to extend the length of the light receiving element array, while achieving an improvement in precision of detection of the laser light receiving position.

In addition, the level device according to the present invention is capable of achieving a further improvement in precision of an origin position of a horizontal level reference plane.

Although the preferred embodiments of the present invention have been described, it should be noted that the present invention is not limited to these embodiments, various changes and modifications can be made to the embodiments,

What is claimed is:

1. A detection sensor to detect a receiving position of laser light, comprising:
    a plurality of light receiving element arrays arranged adjacent each other, each including a plurality of light receiving elements arranged at intervals in line wherein adjacent light receiving elements in each light receiving element array are mutually connected via a resistor, and output lines are connected to light receiving elements arranged at opposite ends of each of the light receiving element arrays; and
    an analysis arithmetic device connected to the plurality of light receiving element arrays;
    wherein
    the plurality of light receiving element arrays are arranged such that, for each adjacent pair of light receiving element arrays, a light receiving element of ene a first light receiving element array is positioned between light receiving elements of a second light receiving element array; and
    the output line for each of the plurality of light receiving element arrays is respectively connected to the analysis arithmetic device, and, when a laser beam makes contact with at least one of the light receiving elements, the analysis arithmetic device is configured to obtain a light receiving position of the laser beam, by way of a computation, in accordance with an output that is obtained from an output line of at least one light receiving element which is in contact with the laser beam,
    wherein the plurality of light receiving element arrays include a central light receiving element array and two light receiving element arrays respectively arranged at opposite sides of the central light receiving element array, and
    wherein the two light receiving element arrays are positioned symmetrically with regard to the central light receiving element.

2. The detection sensor to detect a receiving position of laser light according to claim 1, wherein:
    the analysis arithmetic device is configured to obtain the light receiving position of the laser beam, by way of taking a weighted average of an output that is obtained from the first light receiving element array in each adjacent pair of light receiving element arrays and an output that is obtained from the second light receiving element array in each adjacent pair of light receiving element arrays.

3. The detection sensor to detect a receiving position of laser light according to claim 1, wherein:
  each of the plurality of light receiving element arrays have the same structure.

4. The detection sensor to detect a receiving position of laser light according to claim 1, wherein:
  each light receiving element has a rectangular shape, and a width of each light receiving element and an interval between the light receiving elements are identical.

5. The detection sensor to detect a receiving position of laser light according to claim 1, wherein:
  a diameter of a beam spot of the laser beam is set to be greater than an interval between a light receiving element that is associated with the first light receiving element array in each adjacent pair of light receiving element arrays and a light receiving element that is associated with the second light receiving element array in each adjacent pair of light receiving element arrays.

6. A level device comprising the detection sensor to detect a receiving position of laser light according to claim 1.

* * * * *